March 26, 1940.  J. W. LOGAN, JR  2,194,759
BRAKE SYSTEM
Filed April 8, 1939  2 Sheets-Sheet 1

INVENTOR
JOHN W. LOGAN JR.
BY *A. M. Higgins*
ATTORNEY

March 26, 1940.   J. W. LOGAN, JR   2,194,759
BRAKE SYSTEM
Filed April 8, 1939   2 Sheets-Sheet 2
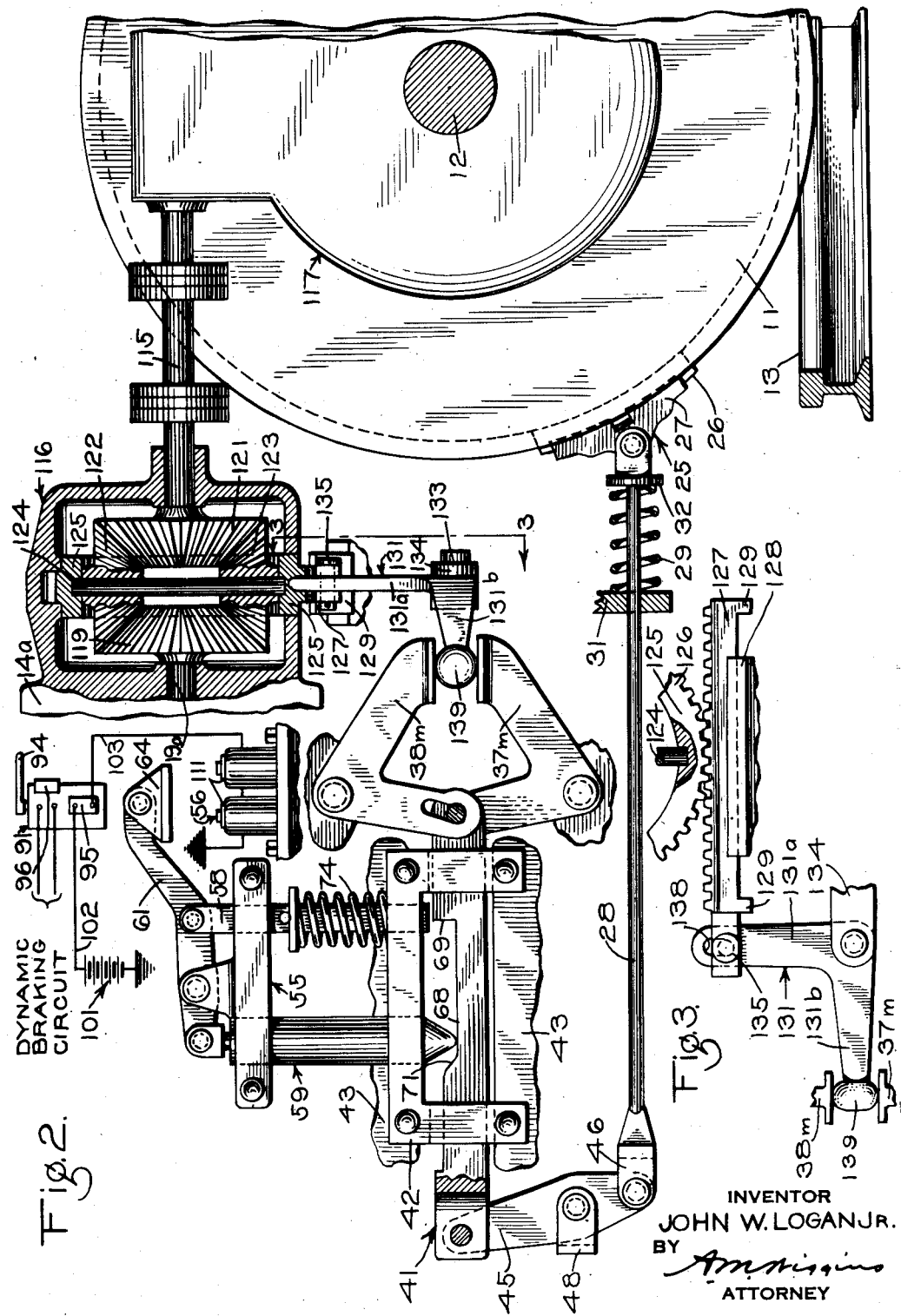
INVENTOR
JOHN W. LOGAN Jr.
BY
A. M. Higgins
ATTORNEY

UNITED STATES PATENT OFFICE 2,194,759

BRAKE SYSTEM

John W. Logan, Jr., Forest Hills, Pa., assignor to The Westinghouse Air Brake Company, Wilmerding, Pa., a corporation of Pennsylvania Application April 8, 1939, Serial No. 266,728

21 Claims. (Cl. 188—2)

This invention relates to brake systems for vehicles such as railway cars and trains, especially to brake systems including wheel brake devices of the spring applied type, and has particular relation to arrangements for controlling the application and the release of the spring applied brake devices under the control of other brake devices, such as dynamic brake apparatus.

It is common practice in railway vehicles, particularly of the street railway type, to support one end of the driving motor frames pivotally on the wheel axles and the opposite end on a fixed part of the vehicle wheel truck, a pinion on the motor shaft meshing with a gear wheel fixed to the wheel axle, thereby enabling the pinion and the gear wheel to be maintained in constant meshing relation despite relative movement between the wheels and the frame of the vehicle truck while traveling along the track rails. Accordingly, in a brake equipment in which the traction motors are connected and employed for dynamically braking the wheels, a torque is exerted on the traction motor frames urging them pivotally with respect to the wheel axles in proportion to the degree of dynamic braking torque exerted on the wheels.

In my present invention, I propose to employ the torque exerted on the traction motor frames of a railway vehicle upon dynamic braking of the wheels by the traction motor to control the application of spring applied wheel brake devices to effect the gradual application thereof as the dynamic braking torque on the wheels diminishes toward the end of a stop.

When the traction motors of a railway vehicle propel the vehicle, the current supplied to the traction motors causes a torque to be exerted on the motor frames in proportion to the motor torque required to start the car in motion. Accordingly, I further propose in my present invention to employ mechanism associated with the motor frames and responsive to the torque required to start a vehicle or car in motion for effecting the release of spring applied wheel brake devices.

It is accordingly an object of my invention to provide a vehicle brake system including vehicle traction motors employed to dynamically brake the vehicle and spring applied wheel brake devices, and in further providing an arrangement whereby the dynamic braking torque of the traction motors on the car wheels holds the spring applied brake means released and permits the application thereof according to the diminution in the dynamic braking effect.

Another object of my invention is to provide a brake system of the general character indicated in the foregoing object and including mechanism responsive to the motor torque required to drive a vehicle for effecting the release of a spring applied wheel brake device.

A further object of my invention is to provide a vehicle brake equipment of the character indicated in the foregoing objects and including an arrangement whereby the spring applied wheel brake devices are released by electrical means and applied in response to the diminishing dynamic braking torque of the traction motors.

It is a still further object of my invention to provide a vehicle brake system of the type indicated in the foregoing objects and including an arrangement whereby the spring applied wheel brake devices are normally released by electrical means and adapted to be released in response to the motor torque required to drive the vehicle in the event that the electrical releasing means fails to do so.

The above objects and other objects of my invention which will be made apparent hereinafter, are attained by several embodiments of my invention subsequently to be described and shown in the accompanying drawings, wherein Fig. 1 is a diagrammatic view, showing one embodiment of my invention, Fig. 2 is a diagrammatic view showing a second embodiment of my invention, and Fig. 3 is a fragmental view showing in further detail the construction and arrangement of parts of the second embodiment shown in Fig. 2.

*Description of embodiment shown in Fig. 1*

Figure 1:
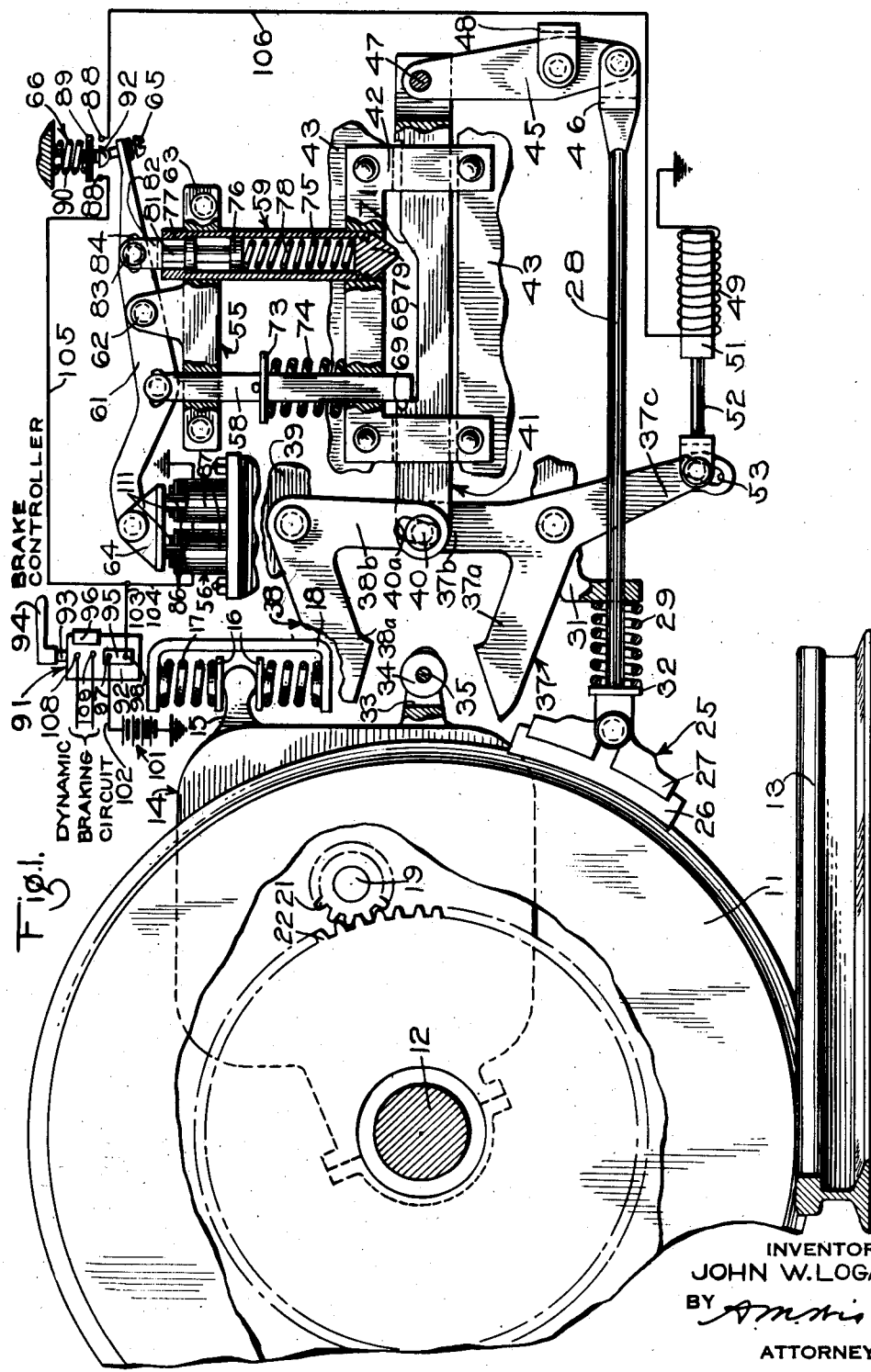

Referring to Fig. 1, there is shown a car wheel 11, which is one of a pair of wheels fixed to an axle 12 that is mounted in a wheel truck frame in conventional manner, the wheel rolling on an associated track rail 13. Pivotally mounted on the axle 12 between the two wheels in conventional manner is a driving motor 14 having a projecting lug or nose 15 supported between two followers 16 by corresponding centering springs 17 carried by a supporting channel bracket member 18 that is secured to a fixed part of the vehicle truck frame.

Fixed to the outer end of the motor shaft 19 is a pinion 21 which meshes with a suitable gear wheel 22 fixed to the wheel axle 12.

Associated with and adapted to frictionally contact the outer rim or tread of the vehicle wheel 11 is a spring applied brake device 25 having a suitable brake shoe 26 fixed in a brake head 27 which is pivotally connected to one end of a suitable supporting and actuating rod 28. Brake device 25 is yieldingly urged into engagement with the rim of the wheel by a coil spring 29 that is interposed between a bracket 31, secured to a fixed part of the vehicle truck frame, and a collar 32 formed on or attached to the actuating rod 28.

According to my invention, I provide on the driving motor frame, either attached to or integrally formed therewith, a yoke 33 between the arms of which a roller 34 is supported as on a pin 35. Associated with the roller 34 in a manner to be more fully described hereinafter, are a pair of bell crank levers 37 and 38 respectively, the lever 37 being pivoted at the fulcrum thereof on a fixed part of the vehicle truck frame, for example the bracket 31, and the lever 38 being pivoted at the fulcrum thereof on a fixed part of the truck frame, such as a member 39.

The lever 37 has three arms $37a^3$, 37b and 37c radiating outwardly from the fulcrum in a manner simulating the letter Y and the lever 38 has two arms 38a and 38b spaced at an acute angle to each other with respect to the fulcrum and simulating the letter V.

The levers 37 and 38 are arranged on opposite sides of the yoke 33 and the end surfaces on the arms 37a and 38a are so positioned as to engage diametrically opposite points of the roller 34.

The outer end of each of the arms 37b and 38b of the levers 37 and 38 is pivoted, as by a pin 40, on one end of a draw bar 41 which is mounted for slidable movement longitudinally in a guide frame 42 carried by a fixed part 43 of the vehicle truck frame. The arrangement of the levers 37 and 38 is such that when the lever 37 is rotatably moved on its fulcrum in a counterclockwise direction, the draw bar 41 is shifted in a left-hand direction as seen in Fig. 1, whereas clockwise movement of the lever 38 on its fulcrum effects movement of the draw bar 41 in the same direction. Obviously, since the draw bar 41 moves in a straight line, a loose connection is provided between each of the arms 37b and 38b and the draw bar 41, this being indicated by the slot 40a in arm 38b.

The end of the draw bar 41 opposite to that at which the lever arms 37b and 38b are pivoted is adapted to be connected to the free end of the operating rod 28 of the brake device 25 in a manner so as to shift the rod 28 in the right-hand direction against the yielding opposing force of the spring 29 when the draw bar 41 is moved in the left-hand direction. For purposes of illustration, this connection between the draw bar 41 and the operating rod 28 is shown in the form of a lever 45 which is pivoted at its lower end in a clevis 46 formed at the outer end of the operating rod 28 and at its upper end on a transversely extending pin or rod 47 fixed in the outer end of the draw bar 41, the lever 45 being pivoted at a point between the ends thereof on a suitable bracket 48 secured to a fixed part of the vehicle truck frame.

A power device, illustrated in the form of a solenoid 49 having an associated plunger 51 and stem 52 pivotally connected to the outer end of the arm 37c of the lever 37, is provided for shifting the draw bar 41 in the left-hand direction to effect the withdrawal of the spring applied wheel brake device 25 from the rim of the vehicle wheel 11. The end of the arm 37c of lever 37 may be provided with a suitable slot 53 to provide the necessary loose connection with the stem 52 of the solenoid plunger 51.

According to my invention, I have provided a latch mechanism 55 which is automatically operated into locking cooperation with the draw bar 41 in response to the movement of the draw bar in the left-hand direction and held in locking position by an electromagnet 56.

As illustrated, the latch mechanism 55 comprises a latch rod or pin 58 and an actuating plunger 59, the pin and plunger being pivoted at corresponding ends thereof on a lever 61 on opposite sides respectively of the fulcrum pin 62 for the lever 61 which is carried by a bracket 63 secured to a fixed part of the vehicle truck frame. One end of the lever 61 has a shoe 64 of magnetic material pivotally carried thereby adapted to be acted upon by the electromagnet 56 and the opposite end of the lever 61 has an adjustable screw 65 adapted to effect operation of a switch device 66.

The latch pin 58 and the actuating plunger 59 are guided in parallel relation in suitable openings provided in the bracket 42 guiding the draw bar 41 and in the bracket 63 on which the lever 61 is pivoted, the lower end of the latch pin and of the actuating plunger cooperating with a notch or recess 68 formed in the draw bar 41. One end of the notch 68 has a square shoulder 69 adapted to be engaged by the lower end of the latch pin 58 and the opposite end of the notch has an inclined or cam surface 71 adapted to be engaged by the lower end of the actuating plunger 59.

The point at which the plunger 59 is pivotally connected to the lever 61 is a shorter distance from the fulcrum pin 62 than is the point of pivotal connection of the latch pin 58 to the lever 61 for a reason which will be presently made apparent.

Interposed between the guide bracket 42 and a suitable collar 73 fixed on the latch pin 58 is a coil spring 74 which is effective when the electromagnet 56 is deenergized to urge the latch pin upwardly a distance sufficient for the lower end of the latch pin to clear the shoulder 69 of the notch 68 in the draw bar 41, the actuating plunger 59 being shifted reversely so that the lower end of the plunger enters the notch 68.

The actuating plunger 59 is made up of a tube 75 within which is a double piston 76 that is urged into engagement with a stop shoulder 77, formed at the upper end of the tube, by a coil spring 78 interposed between the piston 76 and a screw plug 79 screwed into the opposite end of the tube. The piston 76 has a stem 81 which extends out of the upper end of the tube and has a clevis 82 that straddles the lever 61 and is pivotally connected to the lever 61 as by a pin 83 extending through a slot 84 in the lever. The screw plug 79 at the lower end of the actuating plunger 59 has a conical shape with a rounded end that is adapted to engage the cam surface 71 of the notch 68 in the draw bar 41 so that, when the latch pin 58 is in its raised position out of the notch 68, the movement of the draw bar 41 in the left-hand direction in response to the energization of the solenoid 49 causes the actuating rod 59 to ride upwardly on the cam surface 71 and thus operate the latch pin 58 downwardly into the notch 68.

The notch 68 is of such length and the distance between the cam surface 71 and the square shoulder 69 is such that when the conical screw plug 79 at the lower end of the actuating plunger 59 begins to ride up the cam surface 71, the square shoulder 69 of the notch 68 has been shifted to the left of the latch pin 58 so that the latch pin is free to move downwardly into the notch 68.

The cam surface 71 on the draw bar 41 is of such length and height that when the draw bar 41 is shifted to its extreme position in the left-hand direction under the influence of the solenoid 49, the conical screw plug 79 will have been raised a maximum distance to the upper edge of the draw bar, thereby effecting the maximum movement of the latch pin 58 into the notch 68 so that the lower end of the latch pin is positioned with slight clearance above the lower edge of the notch 68. As previously stated, the moment arm of the actuating plunger 59 with respect to the fulcrum pin of the lever 61 is less than the moment arm of the latch pin 58 with respect to the fulcrum pin. The reason for such arrangement is to effect a greater downward movement of the latch pin 58 into the notch 68 in comparison to the upward movement of the actuating plunger 59 effected by the cam surface 71.

The electromagnet 56 may comprise a suitable magnetic core 86 of U-shape mounted on a suitable bracket carried by a fixed part of the vehicle truck frame and having a pair of electromagnet coils 87 associated with the core 86 and arranged so that the two pole pieces of the core are of opposite magnetic polarity. Accordingly, when the magnetic shoe 64 bridges the two pole pieces of the core 86 while the coils 87 are energized, a closed magnetic path of low reluctance is formed so that the magnetic shoe 64 is attracted to the pole pieces with sufficient force to hold the lever 61 against the opposing force of the release spring associated with the latch pin 58. Unless the shoe 64 is in close proximity to the tip ends of the pole pieces of core 86, the force of attraction exerted by the magnet coils 87 when energized is insufficient to overcome the opposing force of spring 74.

Slightly before the time that the tip end of the conical screw plug 79 rides up on cam surface 71 out of the notch 68 to the upper edge of the draw bar, the magnetic shoe 64 carried on the end of the lever 61 engages the ends of the pole pieces of core 86 of the electromagnet 56. The spring 78 within the tube 75 of the actuating plunger 59 is thus slightly compressed to insure a firm contact of the magnetic shoe 64 with the ends of the pole pieces of core 86 of the electromagnet 56.

As previously indicated, if the magnet coils of electromagnet 56 are energized at the time that the magnetic shoe 64 on the lever 61 engages the pole pieces of the core 86, sufficient magnetic downward force will be exerted on the outer end of the lever 61 to hold the latch pin 58 in the notch 68 of the draw bar 41 despite the upward opposing force of the release spring 74 for the latch pin 58. Thus, once the draw bar 41 is shifted sufficiently in the left-hand direction, the electromagnet 56 is adapted to hold the latch pin 58 in the notch 68 of the draw bar 41 notwithstanding that the solenoid 49 may thereafter be deenergized and its actuating force removed.

In order to effect deenergization of the solenoid 49, and thereby avoid unnecessary consumption of electric power, after the latch pin 58 has been moved sufficiently into the notch 68, the switch 66 is provided for interrupting the energizing circuit of the solenoid. The switch 66 may comprise a pair of fixed contact members 88 and a contact-bridging member 89 which is urged by a spring 90 into contact with the contact members 88. When the lever 61 is tilted into the position shown in the drawings, the adjusting screw 65 on lever 61 engages the button 92 secured to the contact-bridging member 89, and unseats the contact-bridging member from the contact members 88 against the yielding resisting force of the spring 90 to interrupt the energizing circuit of the solenoid 49.

Upon the deenergization of the solenoid 49, the spring 29 for applying the brake shoe 26 is effective to shift the draw bar 41 in the right-hand direction until the shoulder 69 of the notch 68 in the draw bar engages the lower end of the latch pin 58. With the magnet coils of electromagnet 56 energized, the latch pin 58 is held down in the notch 68 and accordingly further movement of the draw bar 41 in the right-hand direction and movement of the brake shoe 26 into engagement with the rim or tread of the vehicle wheel 11 is prevented. Thus, the latch mechanism 55 effectively maintains the brake shoe 26 in release position, as shown in the drawings.

With the shoulder 69 on the draw bar 41 engaging the lower end of the latch pin 58, the lower end of the actuating plunger 59 is shifted out over the notch 68 but due to the stop shoulder 77 on the upper end of the tube 75 it cannot drop down into the notch 68.

The magnet coils 87 of electromagnet 56 and the solenoid 49 are under the control of a brake controller 91 which is illustrated as comprising a rotary drum 92 fixed on a shaft 93 to which an operating handle 94 for rotating the drum is fixed, the rotary drum 92 carrying in insulated relation thereon a pair of contact segments 95 and 96 respectively.

In the normal or brake release position of the operating handle 94, the contact segment 95 connects a pair of stationary contact fingers 97 and 98 to establish a circuit for energizing the solenoid 49 and the magnet coils of electromagnet 56. This circuit extends from one terminal of a suitable source of electric current, such as the storage battery 101, through a wire 102, contact finger 97, contact segment 95, contact finger 98, to a wire 103, and thence through two parallel branches, one of which includes a wire 104 and the series-connected magnet coils of electromagnet 56, and the other of which includes a wire 105, switch 66, a wire 106 and solenoid 49, the return circuit from the magnet coils of electromagnet 56 and solenoid 49 to the battery 101 being effected as through a ground connection in the manner indicated.

The contact segment 96 on the rotary drum 92 is so disposed with respect to the contact segment 95 as to be normally out of engagement with a pair of stationary contact fingers 108 and 109 when the operating handle 94 of the brake controller is in its brake release position. When the operating handle 94 is shifted out of its normal position into a zone, referred to hereinafter as the brake application zone, the contact segment 96 engages the contact fingers 108 and 109 at substantially the same instant that the contact segment 95 disengages the contact fingers 97 and 98. When the contact segment 96 engages the contact fingers 108 and 109 it completes a circuit identified by the legend "Dynamic braking circuit." This circuit, it should be understood, may be any of the conventional circuits employed for establishing suitable connections whereby the driving motor 14 for the vehicle functions to dynamically brake the vehicle wheels 11.

*Operation of equipment shown in Fig. 1*

Assuming that the brake controller handle 94 is in its normal or brake release position, that the spring applied brake device 25 is held in its release position by latch mechanism 55, as shown, and that the vehicle is traveling along the road under power supplied to the driving motor 14, the operator may effect an application of the brakes by first cutting off the propulsion power to the vehicle driving motor 14 and then shifting the operating handle 94 of the brake controller 91 into the application zone.

According.y, the dynamic braking circuit is set up and the driving motor 14 begins to function to dynamically brake the vehicle wheels 11.

Assuming that the shaft 19 of the driving motor 14 is rotating in a counterclockwise direction as seen in Fig. 1 so that the vehicle wheel 11 is correspondingly rotating in a clockwise direction, the rotative deceleration of the motor shaft 19 due the dynamic braking thereof will cause a reactive force to be exerted on the pinion 21 by the gear wheel 22 so that pivotal movement of the driving motor frame in a clockwise direction about the axle 12 of the vehicle wheels 11 results. This shifting of the driving motor 14 is opposed by the lower centering spring 17 but such opposition is relatively slight since the strength of the spring 17 need be only sufficient to support the motor 14 in its normal position.

The displacement of the vehicle motor frame out of its normal position is limited by the engagement of the spring follower 16 associated with the lower centering spring 17 with the lower flange of the supporting channel member 18 but such engagement does not occur until after the roller 34 carried in the yoke 33 on the motor frame engages the outer end of the arm 37a of the Y-shaped lever 37.

In order to insure that the dynamic braking effort is built up sufficiently to cause the frame of the motor 14 to be displaced out of its normal position to a degree that the roller 34 engages the end of the lever arm 37a before the latch pin 58 is withdrawn in response to the deenergization of the magnet coils of electromagnet 56, a lag ring 111 of copper or other suitable material may be provided in associated relation with the pole pieces of the core 86 of electromagnet 56 to inhibit the dying away of the magnetic flux of the electromagnet in response to the deenergization of the magnet coils thereof caused by operation of the brake controller into the application zone. Thus, although the contact segment 95 of the brake controller is shifted out of contact with the contact fingers 97 and 98 to interrupt the energizing circuit of the magnet coils of the electromagnet 56, the attraction of the pole pieces of the magnet core 86 upon the magnetic shoe 64 at the end of the lever 61 is maintained for a slight interval of time so as to prevent the withdrawal of the latch pin 58 from the notch 68 of the draw bar 41 until after the dynamic braking torque of the motor 14 is sufficient to cause the roller 34 to engage the outer end of the lever arm 37a and thus maintain the draw bar 41 in position against the opposing force of the spring 29 tending to shift the draw bar in the right-hand direction.

When the force of attraction of the electromagnet 56 on the magnetic shoe 64 at the end of the lever 61 diminishes sufficiently, the spring 74 becomes effective to raise the latch pin 58 upwardly so that the lower end thereof clears the square shoulder 69 at the left end of the notch 68 in the draw bar 41. Spring 74 is of sufficient strength to raise the latch pin 58 even though the shoulder 69 of draw bar 41 is urged by spring 29 into contact therewith. Upon the withdrawal of the latch pin 58 in the manner just described, and the rocking of the lever 61 in a clockwise direction, the actuating plunger 59 is moved correspondingly downward.

If the dynamic braking force effective to urge the draw bar 41 in the left-hand direction is sufficient to move the draw bar 41 in the left-hand direction from the latched position shown, the lower end of the plunger 59 may engage the upper surface of the draw bar thus preventing the withdrawal of the latch pin 58 until such time as the dynamic braking force holding the draw bar 41 in such position reduces sufficiently to permit the spring 29 to move the draw bar 41 in the right-hand direction and permit the lower end of the plunger 59 to slide down the cam surface 71 in the notch 68 so that the latch pin 58 may be shifted upwardly to clear the square shoulder 69 on the draw bar.

As the dynamic braking torque of the driving motor 14 further diminishes, the spring 29 becomes effective to further shift the draw bar 41 in the right-hand direction and simultaneously therewith effect movement of the brake shoe 26 toward and eventually into contact with the outer rim of the vehicle wheel 11.

After the brake shoe 26 engages the rim of the vehicle wheel 11, the force with which it is pressed thereto by the spring 29 will increase according to and depending upon the diminution in the dynamic braking torque of the motor 14 exerted to oppose the force of the spring 29.

It will accordingly be seen that when the vehicle approaches a stop and the dynamic braking torque of the motor 14 reduces to a negligible amount, the full force of the spring 29 becomes effective to apply the brake shoe 26 to the rim of the car wheel 11. Accordingly, it will be seen that the arrangement provided is such that the spring applied brake device 25 is applied automatically in response to the diminution of dynamic braking torque of the driving motor 14 of the vehicle so as to supplement the reduction in dynamic braking effort due to reducing speed of the vehicle and eventually to act as a parking brake for the vehicle when the dynamic braking effort disappears altogether due to the reduction of the vehicle speed below a certain speed as it approaches a stop.

In order to effect release of the spring applied brake device 25 prior to again starting the car, the operator merely shifts the brake controller handle 94 back to its normal or brake release position wherein the dynamic braking circuit is interrupted and the circuit for energizing the magnet coils of electromagnet 56 and the solenoid 49 is established. Upon energization of the solenoid 49, the plunger 51 thereof is shifted in the right-hand direction so as to rock the Y-shaped lever 37 on its fulcrum in a counterclockwise direction and thus move the draw bar 41 in the left-hand direction to effect movement of the brake shoe 26 away from the rim of the vehicle wheel against the opposing force of the spring 29. Movement of the draw bar 41 in the left-hand direction as just described causes operation of the latch mechanism 55 to lock the draw bar 41 in a position to hold the spring applied brake device 25 released and at the same time to interrupt the energizing circuit for the solenoid 49 by opening the switch 66. In this connection, it should be understood that the operation of the switch 66 by the lever 61 is purely illustrative and that any mechanism for opening the switch 66 in response to the movement of the draw bar 41 may be employed.

When propulsion circuits are set up and propulsion current supplied to the driving motor 14 to start the vehicle, the reaction between the pinion 21 on the motor armature shaft 19 and the gear wheel 22 on the wheel axle 12 is such as to cause pivotal movement of the frame of the motor 14 about the axle 12 in a counterclockwise direction, such movement being resisted by the upper centering spring 17. It is possible therefore to utilize the initial propulsion torque of the motor 14 for releasing the spring applied brake device 25 if the force of the spring 29 applying the brake shoe 26 is not too great. Thus, in Fig. 1, if the energizing circuit for the solenoid 41 is accidentally broken or if for any other reason the return of the brake controller handle 94 to release position fails to energize the solenoid 49 to effect a release of the spring applied brake device 25 prior to starting the vehicle, the propulsion torque of the driving motor 14 causes shifting of the motor frame in a counterclockwise direction about the axle 12 until the roller 34 on the motor frame engages the outer end of the arm 38a of the bell crank lever 38 and then acts to shift the lever in a clockwise direction so as to correspondingly shift the draw bar 41 in the left-hand direction. Upon sufficient movement of the draw bar 41 in the left-hand direction, the latch pin 58 is automatically shifted into latching position in the notch 68 in the same manner as in the case of movement of the draw bar 41 by the solenoid 49.

It will thus be seen that in cases where the spring 29 is not too great in strength, the initial starting torque of the motor 14 may be employed to guarantee the release of the spring applied brake device 25 in the event that the normal releasing means shown in the form of the solenoid 49 is ineffective to effect such release. Obviously, if desired, the solenoid 49 may be omitted in such case and the spring applied brakes 25 released normally in response to the starting torque of the motor 14.

If the direction of rotation of the motor shaft 19 is clockwise as seen in Fig. 1, thus causing rotation of the vehicle wheel 11 in a counterclockwise direction, the operation of the brake controller 94 into the application zone to set up the dynamic braking circuit for the motor 14 will result in a pivotal movement of the frame of motor 14 on the axle 12 in a counterclockwise direction. In such case, therefore, the roller 34 engages the outer end of the arm 38a of the bell crank lever 38 in response to the dynamic braking torque of the motor 14 and maintains the spring applied brake device 25 released and then gradually permits application thereof as the dynamic braking torque reduces. If the initial propulsion torque of the motor 14 is employed to effect the release of the spring applied brake 25 for this direction of rotation, it will be understood that the roller 34 carried on the motor 14 will engage the outer end of the arm 37a of the Y-shaped lever 37 to effect shifting of the draw bar 41 in the left-hand direction to release the spring applied brakes. Accordingly, the two levers 37 and 38 enable the control of the application and the release of the spring applied brake 25 in response to the dynamic braking torque on the motor 14 or the initial propulsion torque of the motor 14 for either direction of rotation of the motor.

Embodiment shown in Fig. 2

In Fig. 2, a different arrangement is shown for utilizing the dynamic braking torque and the initial propulsion torque of a vehicle driving motor in controlling the application and the release of a spring applied brake. For simplicity, the parts of the embodiment shown in Fig. 2 corresponding to those in the embodiment shown in Fig. 1 are designated by the same reference numerals and description thereof is not repeated. Accordingly, only those parts not present in the embodiment shown in Fig. 1 or which differ from those shown in Fig. 1 will be described in connection with Fig. 2.

The vehicle driving motor 14a in Fig. 2 is not pivoted on the wheel axle as in Fig. 1 but is suitably secured in the vehicle wheel truck in a manner and in a position to effect rotation of a flexible drive shaft 115 through an intervening differential gear mechanism 116, the drive shaft 115 being coupled through a suitable gear mechanism indicated generally at 117 to the vehicle wheel axle 12.

The differential gear mechanism 116 is provided with a suitable casing preferably an extension of or attached to the end of the frame of the motor 14a. The end of the armature shaft 19a of the motor 14a projects into the casing of the differential gear mechanism and has a bevel gear 119 fixed thereon. The end of the drive shaft 115 is suitably journaled at one end in the casing of the differential gear mechanism and has a bevel gear 121 fixed on the end thereof within the casing in coaxial spaced relation to and oppositely facing the bevel gear 119. Meshing with the two bevel gears 119 and 121 at diametrically opposite points respectively are two bevel gears 122 and 123 which are rotatably mounted on a pin or shaft 124 that is fixed in diametrical relation within a ring gear 125. The ring gear 125 is suitably guided in an annular groove formed in the casing of the differential gear mechanism and is provided with external spur gear teeth 126. A portion of ring gear 125 projects out of the casing through a suitable opening and meshes with a gear rack 127 that is supported for sliding movement in a suitable guide member 128. The gear rack 127 is provided at opposite ends thereof with suitable lugs 129 that are adapted to engage opposite ends of the guide member 128 to limit the movement of the rack 127 in opposite directions.

A bell crank lever 131 having two arms 131a and 131b disposed at an angle to each other is pivoted at the fulcrum thereof, by a pin 133, on a bracket 134 that is secured to a fixed part of the vehicle wheel truck. The outer end of the arm 131a is pivotally connected to one end of the gear rack 127 as by a pin 135 extending through the rack and engaging in a suitable slot 138 at the end of the arm.

The outer end of the arm 131b is provided with a ball-shaped knob 139 that corresponds in function to the roller 34 carried by the driving motor 14 in the embodiment shown in Fig. 1, being adapted to engage and cooperatively move two bell crank levers 37m and 38m corresponding to the levers 37 and 38, respectively, of Fig. 1. The levers 37m and 38m are pivoted at their respective fulcrums and are arranged to shift the draw bar 41 in the right-hand direction as seen in Fig. 2 in opposition to the force of the spring 29 applying the brake shoe 26 to the rim of the vehicle wheel 11 when the bell crank lever 131 is rocked in one or the other directions out of its normal position shown. In view of the arcuate travel of the knob 139 at the end of the lever arm 131b, the ends of the levers 37m and 38m which are engaged by the knob are provided with suitable wide flanges so that as the bell crank lever 131 is rocked on its fulcrum the knob 139 does not disengage the end of the lever arm.

The lever 37m differs from the lever 37 of Fig. 1 in that it has only two arms instead of three, the third arm being unnecessary in view of the fact that the actuating means in the form of a solenoid 49 shown in Fig. 1 is not employed in Fig. 2.

*Operation of equipment shown in Fig. 2*

Let it be assumed that the vehicle is stopped and that the brake controller handle 94 is in its normal release position. In such position of the brake controller handle, the magnet coils of electromagnet 56 of the latching mechanism 55 are energized. However, the magnetic force of attraction exerted by the electromagnet 56 on the magnetic shoe 64 carried by the lever 61 is insufficient to overcome the release spring 74 for the latch pin 58 due to the large air gap between the shoe 64 and the pole pieces of core 86 of the electromagnet 56. With latch pin 58 accordingly in its raised position, spring 29 is effective to urge the brake shoe 26 into frictional engagement with the rim of the vehicle wheel 11 while the vehicle is stopped, as shown in Fig. 2. At the same time, with neither propulsion nor dynamic braking torque on the motor shaft 19a, the spring 29 is effective to shift the draw bar in the left-hand direction so that the levers 37m and 38m are rocked into the position shown wherein the outer flanged ends of the levers are moved into contact with diametrically opposite points of the knob 139 on the end of the lever arm 131b, thereby restoring the bell crank lever 131 and incidentally the gear rack 127 to their respective normal neutral positions in which the stop lugs 129 at the ends of the gear rack are substantially equal distances from the corresponding ends of the gear rack guide member 128 as shown in Fig. 3.

Let it now be assumed that the operator operates a suitable motor controller (not shown) to supply propulsion current to the driving motor 14a to start the vehicle in motion. The propulsion torque on the motor shaft 19a drives the vehicle wheels through the differential gear mechanism 116. The reaction between the bevel gear 119 on the motor shaft 19a and the bevel gear 121 on the drive shaft 115 is such as to cause limited rotative movement of the ring gear 125 in one direction or the other depending upon the direction of rotation of the motor shaft 19a.

Let it be assumed, for example, that the propulsion torque on the motor shaft 19a is such as to cause rotation of the ring gear 125 in a counterclockwise direction as seen in Fig. 3 and that the gear rack 127 is correspondingly shifted in the right-hand direction. The bell crank lever 131 is correspondingly shifted in a clockwise direction as seen in Fig. 3 so that the knob 139 on the end of the lever arm 131b is moved vertically upward in Fig. 2 to rock the bell crank lever 38m in a counterclockwise direction. Assuming of course that the torque force exerted by the motor shaft 19a is sufficient to overcome the force of the spring 29 holding the brake shoe 26 in frictional contact with the rim of the vehicle wheel, it will therefore be apparent that the draw bar 41 will be shifted in the right-hand direction by the rocking of the upper bell crank lever 38m to cause the release of the spring applied brake device 25 and, at the same time, the operation of the latch mechanism 55 to latch the drawbar 41 in position to hold the spring applied brake device 25 released thereafter independently of the propulsion torque.

Assuming now that the vehicle is traveling along the road under power with the spring applied brake device 25 released as just described and that the operator desires to effect an application of the brakes, he may do so by first interrupting the motor circuit supplying propulsion current to the motor and then shifting the brake controller handle 94 into the application zone.

Upon the establishment of the dynamic braking circuit under the control of the brake controller 91, the reaction between the two bevel gears 119 and 121 is such as to cause rotative movement of the ring gear 125 in a clockwise direction as seen in Fig. 3, thus causing the gear rack 127 to be shifted in the left-hand direction.

Due to the slight delay in releasing the latch pin 58, following interruption of the energizing circuit of the electromagnet 56, caused by the lag rings 111, sufficient dynamic braking torque will be exerted on the draw bar 41 to hold it against return movement in the left-hand direction, thereby holding the brake shoe 26 in release position in opposition to the spring 29. Thereafter, with the latch pin 58 withdrawn out of the notch 68 in the draw bar 41, the reduction of the dynamic braking torque of motor 14a with reducing speed of the vehicle will permit the movement of the draw bar 41 and consequent application of the brake device 25 in accordance with and depending upon the degree of reduction of the dynamic braking torque. When the speed of the vehicle reduces below a certain low speed, such as ten miles per hour, and the dynamic braking torque reduces substantially to zero, the spring 29 becomes effective to apply the brake shoe 26 to the rim of the vehicle wheel with a maximum degree of force.

It will thus be apparent that in the embodiment shown in Fig. 2, the spring applied brake device 25 remains applied at all times while the vehicle is stopped and is released only in response to the initial propulsion torque of the driving motor 14a as distinguished from the embodiment shown in Fig. 1 wherein the return of the brake controller handle 94 to release position normally effects the release of the spring applied brake device. As previously indicated, the return of the brake controller handle 94 in Fig. 2 to release position interrupts the dynamic braking circuit and establishes a circuit for energizing the magnet coils of electromagnet 56, but such energization of the magnet coils is without effect and cannot operate to release the spring applied brakes.

Obviously, if the direction of rotation of the motor shaft 19a of the motor 14a is opposite to that originally assumed, upon the supply of propulsion current to the motor, the bell crank lever 131 will be shifted in the opposite or counterclockwise direction as seen in Fig. 3. In this instance, the knob 139 on the lever arm 131b engages the end of the arm of the lever 37m and causes rocking thereof to effect the release of the spring applied brakes. Likewise, upon the establishment of the dynamic braking circuit for the driving motor 14a, the bell crank lever 131 will, in such case, be rocked in a clockwise direction until the knob 139 engages the end of the arm of the lever 38m which accordingly acts to restrain the movement of the draw bar and the consequent movement of the spring applied brake shoe 26 into frictional engagement with the rim of the vehicle wheel.

Summary

Summarizing, it will be seen that I have disclosed two arrangements for coordinating the propulsion and dynamic braking torque of a vehicle driving motor with a spring applied brake device so as to control the application and the release of the spring applied brake device.

In one embodiment, the spring applied brake device is actuated to release position and latched therein by electrical actuating and latching means, the dynamic braking torque of the motor being adapted to resist the force of a spring applying the spring applied brakes with a force corresponding to the dynamic braking torque as the speed of the vehicle reduces thus causing the spring applied brakes to be applied with an increasing force corresponding to and dependent upon the degree of reduction of the dynamic braking torque of the driving motor. In this embodiment, the propulsion torque of the motor is adapted to effect release of the spring applied brake only in the event of failure of the electrical release means.

In the second embodiment, the vehicle driving motor drives the vehicle wheels through a differential gear mechanism, which has a differential or ring gear element that is shifted in one direction or the other with a force corresponding to the degree of propulsion or dynamic braking torque of the vehicle driving motor, the differential gear element being adapted to transmit the force exerted thereon so as to release the spring applied brakes when the vehicle starts and subsequently being adapted to hold the spring applied brakes released and permit the gradual application thereof with increasing force as the dynamic braking torque of the motor decreases with reducing speed of the vehicle.

While I have shown only two embodiments of my invention, it will be apparent that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. Vehicle brake apparatus comprising, in combination, a dynamic brake device adapted to exert a braking torque on a vehicle wheel, friction brake means associated with the vehicle wheel, spring means adapted to exert a force causing application of said friction brake means, and means adapted to exert a force proportional to the dynamic braking torque of the said device in opposition to the force exerted by said spring means.

2. Vehicle brake apparatus comprising, in combination, a vehicle driving motor adapted to operate as a dynamic brake and exert a braking torque on a vehicle wheel, friction brake means associated with the vehicle wheel, spring means adapted to exert a force causing application of said friction brake means, and means movably responsive to the dynamic braking torque of said motor for exerting a force proportional to the dynamic braking torque exerted by the motor in opposition to the force exerted by said spring means.

3. Vehicle brake apparatus comprising, in combination, a vehicle driving motor adapted to operate as a dynamic brake and exert a braking torque on a vehicle wheel, friction brake means associated with the vehicle wheel, spring means adapted to exert a force causing application of said friction brake means, and means movably responsive to the dynamic braking torque of said motor for exerting a force proportional to the dynamic braking torque exerted by the motor in opposition to the force exerted by said spring means so as to cause application of the friction brake means by the spring means with a force that increases as the dynamic braking torque exerted by said motor decreases.

4. Vehicle brake apparatus comprising, in combination, a vehicle driving motor adapted to operate as a dynamic brake and exert a braking torque on a vehicle wheel, friction brake means associated with the vehicle wheel, spring means adapted to exert a force for applying said friction brake means, means operative from one position in which it prevents the application of said friction brake means by said spring means to a different position permitting the application of the friction brake means by said spring means, and means adapted to exert a force proportional to the dynamic braking torque exerted by said motor in opposition to the brake applying force exerted by said spring means so as to prevent application of the friction brake means by the said spring means, when said last means is operated to its said different position, as long as the dynamic braking torque exerted by said motor exceeds a certain value.

5. Vehicle brake apparatus comprising, in combination, a vehicle driving motor adapted to operate as a dynamic brake and exert a braking torque on a vehicle wheel, friction brake means associated with the vehicle wheel, spring means adapted to exert a force for applying said friction brake means, means operative from one position in which it prevents the application of said friction brake means by said spring means to a different position permitting the application of the friction brake means by said spring means, and means adapted to exert a force proportional to the dynamic braking torque exerted by the said motor in opposition to the brake applying force exerted by said spring means so that when the last said means is operated to its said different position, said spring means is effective to apply the friction brake means with a force which increases as the dynamic braking torque exerted by said motor decreases.

6. Vehicle brake apparatus comprising, in combination, a vehicle driving motor adapted to operate as a dynamic brake and exert a braking torque on a vehicle wheel, friction brake means associated with the said vehicle wheel, spring means adapted to exert a force for applying said friction brake means, means effective in one position to prevent application of the friction brake means by said spring means and effective in a different position to permit application of the friction brake means by said spring means, means operative to cause said motor to function as a dynamic brake and effective at the same time to cause the last said means to be operated to its said different position, and means adapted to exert a force proportional to the dynamic braking torque of said motor in opposition to the brake applying force exerted by the said spring means so as to cause application of the friction brake means by the spring means with an increasing force dependent upon the decrease in the dynamic braking torque exerted by the motor as the speed of the vehicle reduces.

7. Vehicle brake apparatus comprising, in combination, a motor for driving the vehicle adapted to function as a dynamic brake and to exert a braking torque on a vehicle wheel, friction brake means associated with the vehicle wheels, spring means adapted to exert a force for applying said friction brake means, a member movable in one direction from a certain position thereof to cause movement of the friction brake means in a brake releasing direction in opposition to said spring means, means for moving said member in said one direction to effect the release of the friction brake means, latch mechanism cooperating with said member and operative, upon movement of said member in said one direction, so as to prevent reverse movement of the said member toward its said certain position and thereby hold the friction brake means released, electroresponsive means for holding the latch mechanism in locking cooperation with the said movable member after the latch mechanism is so operated, means adapted to exert a force proportional to the dynamic braking torque of said motor and tending to move the said movable member in said one direction in opposition to the force of said spring means, means for operating the latch mechanism out of locking cooperation with said movable member when the electroresponsive means becomes ineffective to hold the latch mechanism in locking cooperation with the movable member whereby said movable member is permitted to move toward its said certain position and in turn permit the application of the friction brake means by the spring means with an increasing force dependent upon the reduction of the dynamic braking torque of said motor.

8. Vehicle brake apparatus comprising, in combination, friction brake means for said vehicle, spring means adapted to effect application of the friction brake means, a member movable in one direction from a certain position, in which the friction brake means is applied by said spring means, to cause movement of the friction brake means in a brake releasing direction in opposition to said spring means, electrical means for effecting movement of said member in said one direction, a circuit for supplying current to said electrical means to cause it to move said member in said one direction, latch mechanism operative in response to the movement of said member in said one direction into locking cooperation with said member for holding it out of its said certain position so as to hold the friction brake means released, electroresponsive means effective when energized for maintaining said latch mechanism in locking cooperation with said member after the latch mechanism has been so actuated, switch means operated in response to the movement of said member in said one direction for interrupting said circuit and thereby preventing the supply of current to said electrical means after the latch mechanism has been operated into locking cooperation with said member, and biasing means for operating the latch mechanism out of locking cooperation with said member so as to permit movement of said member reversely toward its said certain position and the consequent application of the friction brake means by said spring means when the said electroresponsive means is deenergized.

9. Vehicle brake apparatus comprising, in combination, a vehicle driving motor adapted to function as a dynamic brake and exert a dynamic braking torque on a vehicle wheel, friction brake means associated with the said wheel, spring means adapted to exert a force for applying said friction brake means, a member movable in one direction from a certain position, in which the friction brake means is applied by said spring means, for causing the friction brake means to be moved in a brake releasing direction in opposition to said spring means, electrical means for effecting movement of said member in said one direction, a circuit for supplying current to said electrical means to cause it to move said member in said one direction, latch mechanism operative in response to the movement of said member in said one direction into cooperative relation with said member for holding it out of its said certain position so as to hold the friction brake means released, electroresponsive means effective when energized for holding said latch mechanism in locking cooperation with said member after the latch mechanism has been so operated, switch means operative in response to the movement of said member in said one direction for interrupting said circuit and thereby preventing the supply of current to said electrical means after the latch mechanism has been operated into locking cooperation with said member, biasing means for actuating said latch mechanism out of locking cooperation with said member so as to permit movement of said member reversely toward its said certain position and the consequent application of the friction brake means by said spring means when the said electroresponsive means is deenergized, and means responsive to the dynamic braking torque of said motor for exerting a force proportional to the dynamic braking torque in opposition to the force of said spring means and effective to resist movement of said member reversely toward its said certain position.

10. Vehicle brake apparatus comprising, in combination, a vehicle driving motor adapted to function as a dynamic brake and exert a dynamic braking torque on a vehicle wheel, friction brake means associated with the said wheel, spring means adapted to exert a force for applying said friction brake means, a member movable in one direction from a certain position, in which the friction brake means is applied by said spring means, for causing the friction brake means to be moved in a brake releasing direction in opposition to said spring means, electrical means for effecting movement of said member in said one direction, a circuit for supplying current to said electrical means to cause it to move said member in said one direction, latch mechanism operative in response to the movement of said member in said one direction into cooperative relation with said member for holding it out of its said certain position so as to hold the friction brake means released, electroresponsive means effective when energized for holding said latch mechanism in locking cooperation with said member after the latch mechanism has been so operated, switch means operative in response to the movement of said member in said one direction for interrupting said circuit and thereby preventing the supply of current to said electrical means after the latch mechanism has been operated into locking cooperation with said member, biasing means for actuating said latch mechanism out of locking cooperation with said member so as to permit movement of said member reversely toward its said certain position and the consequent application of the friction brake means by said spring means when the said electroresponsive means is deenergized, means responsive to the dynamic braking torque of said motor for exerting a force proportional to the dynamic braking torque in opposition to the force of said spring means and effective to resist movement of said member reversely toward its said certain position, and means operative to effect deenergization of said electroresponsive means and substantially simultaneously therewith causing the said motor to function as a dynamic brake.

11. Vehicle brake apparatus comprising, in combination, a vehicle driving motor adapted to function as a dynamic brake and exert a dynamic braking torque on a vehicle wheel, friction brake means associated with the said wheel, spring means adapted to exert a force for applying said friction brake means, a member movable in one direction from a certain position, in which the friction brake means is applied by said spring means, for causing the friction brake means to be moved in a brake releasing direction in opposition to said spring means, electrical means for effecting movement of said member in said one direction, a circuit for supplying current to said electrical means to cause it to move said member in said one direction, latch mechanism operative in response to the movement of said member in said one direction into cooperative relation with said member for holding it out of its said certain position so as to hold the friction brake means released, electroresponsive means effective when energized for holding said latch mechanism in locking cooperation with said member after the latch mechanism has been so operated, switch means operative in response to the movement of said member in said one direction for interrupting said circuit and thereby preventing the supply of current to said electrical means after the latch mechanism has been operated into locking cooperation with said member, biasing means for actuating said latch mechanism out of locking cooperation with said member so as to permit movement of said member reversely toward its said certain position and the consequent application of the friction brake means by said spring means when the said electroresponsive means is deenergized, means responsive to the dynamic braking torque of said motor for exerting a force proportional to the dynamic braking torque in opposition to the force of said spring means and effective to resist movement of said member reversely toward its said certain position, means operative to effect deenergization of said electroresponsive means and substantially simultaneously therewith causing the said motor to function as a dynamic brake, and means for inhibiting the movement of the latch mechanism out of locking cooperation with said member for a limited time following deenergization of said electroresponsive means.

12. Vehicle brake apparatus for a vehicle having a pair of wheels fixed to a common axle comprising, in combination, a driving motor for said wheels adapted to function as a dynamic brake for the wheels and having a frame mounted on the axle for rotary movement with respect thereto, friction brake means for said wheels, spring means for exerting a force to apply said friction brake means, means subject to the torque force exerted on the frame of the motor tending to displace the frame rotarily on the axle with respect to a certain position thereof when the motor functions as a dynamic brake and effective to exert a corresponding force in opposition to said spring means to hold the friction brake means released as long as the torque force on the motor frame exceeds a certain value and adapted to permit application of the friction brake means by the said spring means to an increasing degree as the torque force on the motor frame diminishes.

13. Vehicle brake apparatus for a vehicle having a pair of wheels fixed to a common axle comprising in combination a driving motor for said wheels adapted to function as a dynamic brake for the wheels and having a frame mounted on the axle for limited rotary movement with respect thereto, means yieldingly resisting rotary displacement of the motor frame out of a certain position thereof, friction brake means for the said wheels, spring means adapted to exert a force to apply said friction brake means, means subject to and movable in response to the torque force exerted on the motor frame, when the motor functions as a dynamic brake, adapted to oppose the force exerted by the said spring means so as to hold the friction brake means released as long as the torque force on the motor frame exceeds a certain value and thereafter to permit said spring means to apply the friction brake means to an increasing degree as the torque force on the motor frame diminishes, means for actuating the last said means in a direction to cause movement of the friction brake means in a brake releasing direction in opposition to said spring means, means for holding said member in a position to maintain the friction brake means released independently of said actuating means, and means for rendering the last said means ineffective to prevent application of the friction brake means by the said spring means and substantially simultaneously therewith to cause the said motor to function as a dynamic brake.

14. Vehicle brake apparatus for a vehicle having a pair of wheels fixed to a common axle comprising, in combination, a driving motor for said wheels adapted to function as a dynamic brake for the wheels and having a frame rotarily mounted on the said axle, means yieldingly resisting displacement of the said motor frame rotarily with respect to the said axle out of a certain position thereof, friction brake means for the said wheels, spring means adapted to exert a force to apply said friction brake means, a member subject to and movable in response to the torque force exerted on the motor frame when the motor functions as a dynamic brake and adapted to oppose the force exerted by the said spring means so as to hold the friction brake means released as long as the torque force on the motor frame exceeds a certain value and thereafter to permit the said spring means to apply the friction brake means to an increasing degree as the torque force exerted on the motor frame diminishes, power means for actuating said member in a direction to cause movement of the friction brake means in a brake releasing direction in opposition to said spring means, latch means actuated into cooperative relation with the said member in response to the movement thereof in a direction to release the friction brake means for holding the said member against reverse movement to maintain the friction brake means released, holding means effective after the latch means is actuated into cooperative relation with said member for thereafter holding it in cooperative relation with said member independently of said power means, means for rendering the said holding means ineffective to hold the latch means in cooperative relation with said member so as to permit movement of said member and the consequent application of the friction brake means by said spring means and substantially simultaneously therewith to cause the said motor to function as a dynamic brake, and means for inhibiting the operation of the latch means out of cooperative relation with said member for a limited time following the operation of the last said means to cause the said motor to function as a dynamic brake.

15. Vehicle brake apparatus for a vehicle having a wheel and a driving motor for said wheel adapted to function as a dynamic brake therefor, comprising in combination, a friction brake for the said wheel, spring means adapted to exert a force for applying the friction brake means, means movably responsive to the propulsion torque of the motor exerted to drive the said wheel for effecting movement of the friction brake means in a brake releasing direction in opposition to said spring means, and means movably responsive to the dynamic braking torque exerted by said motor on said wheel for holding said friction brake means in a release position in opposition to said spring, as long as the dynamic braking torque exceeds a certain value, and adapted to permit movement of the friction brake means under the influence of said spring means into application position and the application of said friction brake means with an increasing force dependent upon the diminution of the dynamic braking torque below said certain value.

16. Vehicle brake apparatus for a vehicle having a wheel and a driving motor for said wheel adapted to function as a dynamic brake therefor, comprising in combination, friction brake means for said wheel, spring means adapted to exert a force for applying said friction brake means, means movable in response to the torque exerted by the said motor to drive said wheel for moving said friction brake means in a brake releasing direction to a release position in opposition to said spring means, holding means effective upon a predetermined movement of the friction brake means in a brake releasing direction to hold it in release position thereafter independently of the driving torque of said motor, means movable in response to the dynamic braking torque exerted by said motor on said wheel for holding said friction brake means in a release position independently of said holding means as long as the dynamic braking torque exceeds a certain value and adapted to permit movement of the friction brake means into application position and with an increasing force by said spring means dependent upon the degree of diminution of dynamic braking torque below said certain value, and means for rendering said holding means ineffective to prevent movement of the friction brake means to its application position and substantially simultaneously therewith to cause the said motor to function as a dynamic brake.

17. Vehicle brake apparatus for a vehicle having a wheel and a driving motor for said wheel adapted to function as a dynamic brake therefor, comprising in combination, a differential gear mechanism through which the said motor drives and brakes the said wheel, said differential gear mechanism including a differential gear wheel, a friction brake means for said wheel, spring means adapted to exert a force to apply said friction brake means, and means movable in response to the movement of said differential gear wheel when the said motor drives the said wheel for shifting the friction brake means to a brake releasing position in opposition to said spring means and responsive to the movement of the said differential gear wheel when the said motor functions to dynamically brake the said wheel for holding the friction brake means in release position as long as the dynamic braking torque exerted by the motor exceeds a certain value and thereafter effective to permit the said spring means to move the friction brake means into application position and to exert an increasing application force dependent upon the degree of diminution of the dynamic braking torque below said certain value.

18. Vehicle brake apparatus for a vehicle having a wheel and a driving motor for said wheel adapted to function as a dynamic brake therefor, comprising in combination, a differential gear mechanism through which the said motor drives and brakes the said wheel, said mechanism including a differential gear wheel, friction brake means for said wheel, spring means adapted to exert a force to apply said friction brake means, means movable in response to the movement of the differential gear wheel by the propulsion torque of said motor, when the motor initiates propulsion of said wheel, for moving the friction brake means to a release position in opposition to said spring means, holding means for holding said friction brake means released, once it is moved to release position, independently of the propulsion torque responsive means, means for rendering the said holding means ineffective to hold said friction brake means in release position and substantially simultaneously therewith to cause the said motor to dynamically brake said wheel, and means movable in response to the movement of the said differential gear wheel when the said motor dynamically brakes the said wheel for holding said friction brake means in release position independently of said holding means as long as the dynamic braking torque on said wheel exceeds a certain value and thereafter adapted to permit movement of the friction brake means to application position by said spring means and application thereof with an increasing force dependent upon the diminution of the dynamic braking torque on the wheel.

19. Vehicle brake apparatus for a vehicle having a wheel and a motor for driving said wheel, comprising in combination, friction brake means for said wheel, spring means adapted to exert a force for applying said friction brake means, power means normally effective to move the friction brake means to release position in opposition to the force of said spring means, and means movably responsive to the driving torque of the vehicle motor for moving the friction brake means to a release position in opposition to said spring means if said power means does not do so.

20. Vehicle brake apparatus for a vehicle having a wheel and a driving motor for said wheel adapted to function as a dynamic brake therefor, comprising in combination, friction brake means for said wheel, spring means adapted to exert a force to apply said friction brake means, power means for moving the friction brake means to a release position in opposition to the force exerted by the spring means, means responsive to the driving torque of said motor for exerting a corresponding force to move the friction brake means to a release position in opposition to the force of said spring means if the said power means does not do so, holding means independent of said power actuating means or of the propulsion torque responsive means for holding the friction brake means in release position once it is moved thereto, means for rendering the said holding means ineffective to hold the friction brake means in release position and substantially simultaneously therewith to cause the said motor to dynamically brake the said wheel, and means responsive to the dynamic braking torque exerted by the said motor on the said wheel for exerting a corresponding force to hold the friction brake means in release position as long as the dynamic braking torque exceeds a certain value and upon reduction of the dynamic braking torque below said certain value to permit said spring means to apply said friction brake means with a force which increases as the dynamic braking torque decreases.

21. Vehicle brake apparatus comprising, in combination, a dynamic brake device adapted to exert a braking force on a vehicle wheel, friction brake means associated with the vehicle wheel, spring means adapted to exert a force causing application of said friction brake means, holding means for preventing said spring means from applying the friction brake means, manually operative means for simultaneously initiating operation of the dynamic brake means and causing said holding means to be rendered ineffective to prevent application of the friction brake means by the spring means, means effective only when the dynamic brake means exerts at least a certain degree of braking force on the wheel for preventing application of the friction brake means by said spring means, and means effective to delay the operation of the holding means to permit application of the friction brake means by said spring means for a certain limited time following operation of the manually operative means to initiate application of the dynamic brake means.

JOHN W. LOGAN, Jr.